United States Patent [19]

Cole

[11] 4,268,017
[45] May 19, 1981

[54] REACTOR WITH EXTRACTABLE FEED NOZZLE

[75] Inventor: Robert N. Cole, Sarnia, Canada

[73] Assignee: Exxon Research & Engineering Co., Florham Park, N.J.

[21] Appl. No.: 107,898

[22] Filed: Dec. 28, 1979

[51] Int. Cl.³ .............................................. C21B 7/16
[52] U.S. Cl. ...................................... 266/265; 75/60; 266/270
[58] Field of Search .................... 75/60, 59; 266/265, 266/270

[56] References Cited

U.S. PATENT DOCUMENTS

| | | | |
|---|---|---|---|
| 2,855,293 | 10/1958 | Savard | 75/60 |
| 3,330,645 | 7/1967 | De Moustier | 75/60 |
| 3,971,548 | 7/1976 | Folgero | 266/265 |

*Primary Examiner*—P. D. Rosenberg
*Attorney, Agent, or Firm*—Robert S. Salzman

[57] ABSTRACT

A feed nozzle for a liquid fuel or fluid coker feed nozzle for a reactor comprises an outer nozzle shroud with a removable, refractory ceramic fiber wrapped feed nozzle coaxially affixed within the shroud by the coacting of flanges on the outer ends of said shroud and said feed nozzle. A novel method of assembling the same is also disclosed.

6 Claims, 3 Drawing Figures

REACTOR WITH EXTRACTABLE FEED NOZZLE

BACKGROUND OF THE INVENTION

1. Field of the Invention

This invention is related to the feed means for reactors used for chemical or catalytic conversion of hydrocarbons and to reactors used for metallurgical processes. Such reactors frequently use highly erosive materials such as particulate catalysts and particulate coke. High temperature levels are also characteristic of such reactors. The combination of characteristics creates the erosion and breakdown of reactor components, including feed means for said reactors.

When the feed means constitute nozzles having relatively small diameter orifices, but high feed material output, the potential for erosion of the nozzle becomes a significant factor in continuous reactor operation. Such erosion can effect the pattern of the discharge of said nozzle inside said reactor, as well as causing total shutdown of the effected nozzle when erosion causes reactants to backflow into said nozzle.

Repairs to feed nozzles and components create delays in reactor time of use, as well as the efficiency of such reactors during long periods of use between nozzle repairs.

2. Prior Art

The prior art has addressed the problem of feed nozzle erosion in reactors by constructing such nozzles of various materials of increased strength and non-reactivity, such as nickel-chrome steels and refractory packings. The specialty steels are hard to machine, and the costs for such materials are very high.

Other attempts at producing durability of reactor feed nozzles have included the reduction of the temperature conducive to reactivity and erosion by incorporating fluid coolant flow paths in said nozzles as well as providing interchangeability of nozzle components.

In U.S. Pat. No. 4,123,042 to Pearce et al, a tuyere for a metallurgical furnace is disclosed which has an inner and outer tuyere jacket. The jackets are sealed from each other by a fluid, high temperature grout pumped into the space between the jackets and solidified.

U.S. Pat. No. 3,236,281 to Bain et al provides a fuel burner nozzle for an open hearth furnace. The furnace nozzle has a coaxial arrangement of several tubular pipe conduits for supplying diverse materials to the furnace, such as fuel, gas and steam.

In U.S. Pat. No. 299,536 to Hartman, a removable tuyere is disclosed. The tuyere is tapered and fits directly into and against a similarly tapered collar which is permanently affixed within the furnace side wall. This structure provides replaceability of the tuyere but fails to provide longevity of the tuyere because of the absence of any insulative structure for the tuyere from furnace temperature. In addition, the tapered fit of the tuyere and its cover are expensive to manufacture.

SUMMARY OF THE INVENTION

With a view toward overcoming the problems in design of conventional reactor feed nozzles and with a complete understanding of the shortcoming of the prior art attempts to solve such problems by resorting to high cost specialized steel components and/or purging techniques, the present invention comprises a unique replaceable, extractable feed nozzle for a reactor executed in readily available steels. The nozzle consists of an outer nozzle shroud consisting of a large diameter, high temperature pipe affixed to the reactor wall through a bore in the refractory lining and outer steel shell of the reactor and an easily extractable feed nozzle which fits coaxially within the shroud. The tolerance between the inside of the shroud and the outside of the tubular nozzle is purposely large in order that an insulative ceramic fiber material can be wrapped around the feed nozzle inside the shroud. The assembly comprising the shroud and nozzle is connected together by bolts engaging in coacting flanges of each component at the exterior of the reactor.

The invention includes a method for wrapping the feed nozzle with refractory ceramic fiber material, compressing the material with thermoplastic binding and inserting the temporarily compressed composite of ceramic fiber material and the tubular nozzle into said tubular shroud.

With the relationship of the above structure in mind, it is an objective of the present invention to provide an easily replaceable and extractable feed nozzle for a reactor.

It is an objective of the present invention to have a jacketed nozzle that does not require a steam purge to prevent particulate material or reactants from entering the nozzle assembly from the reactor.

It is yet another object to insulate the space between the shroud and the nozzle with a ceramic fiber material.

A further object of the present invention is to provide a nozzle structure applicable to fluid suspension feed or liquid feed materials.

Another objective is to provide a protective refractory ceramic coating for the outer surface of the shroud where it projects into the reactor.

Finally, it is an objective of the present invention to provide a method for the assembly of such a jacketed and insulated feed nozzle.

Other objectives will become readily apparent from a review of the following specification when construed in harmony with the accompanying drawings.

BRIEF DESCRIPTION OF THE DRAWINGS

The invention will be described in greater detail by reference to the following drawings.

DETAILED DESCRIPTION OF A PREFERRED EMBODIMENT

With reference to the above-described drawings, a preferred embodiment of the extractable reactor feed nozzle assembly is set forth hereinafter.

Figure 1:
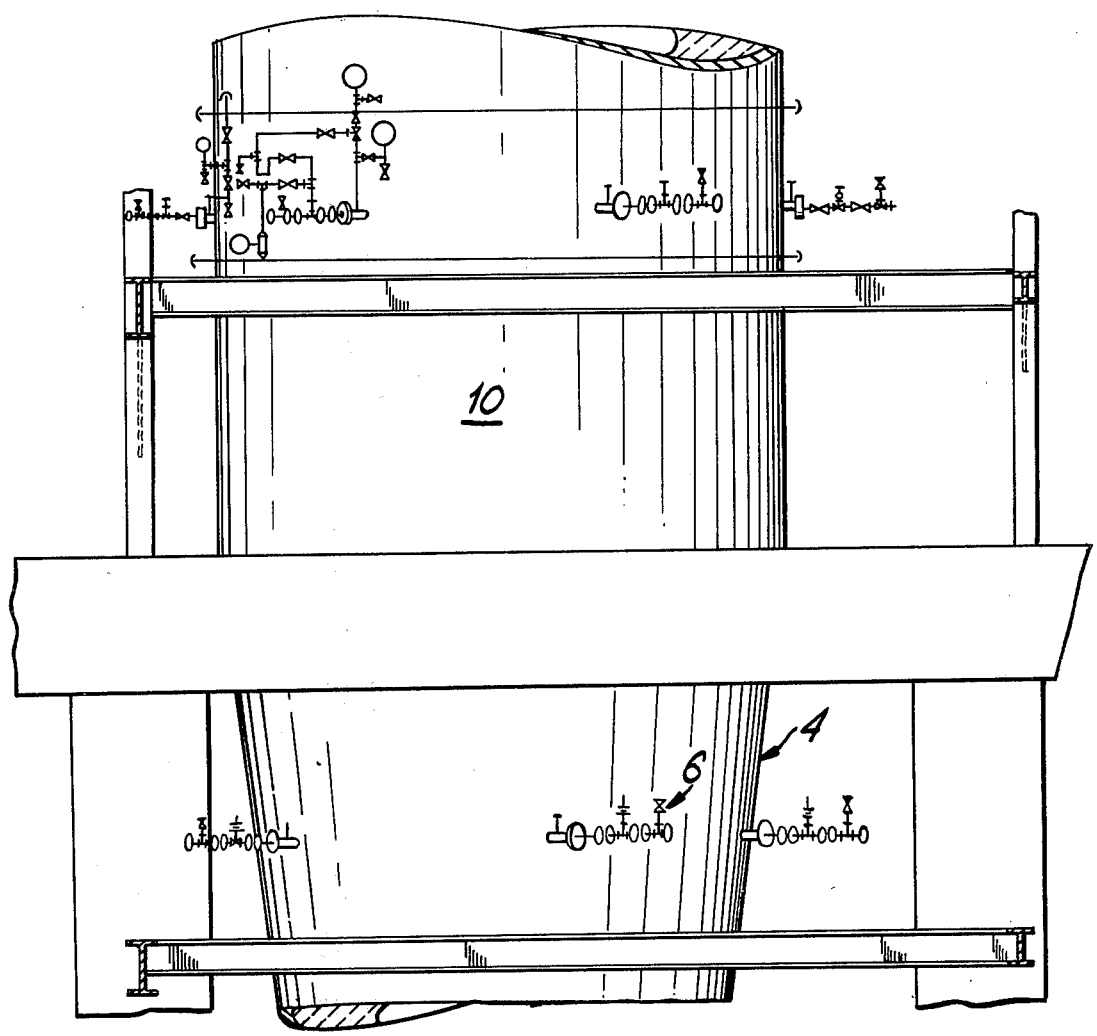
FIG. 1 is a schematic view of a reactor utilizing several feed nozzle assemblies constructed in accordance with the present invention.

As shown in FIG. 1, a reactor 4 has a plurality of feed nozzle assemblies 6 entering the reactor shell 10 at different points about the circumference of the reactor, as well as at different elevations along the vertical axis of the reactor.

Figure 2:
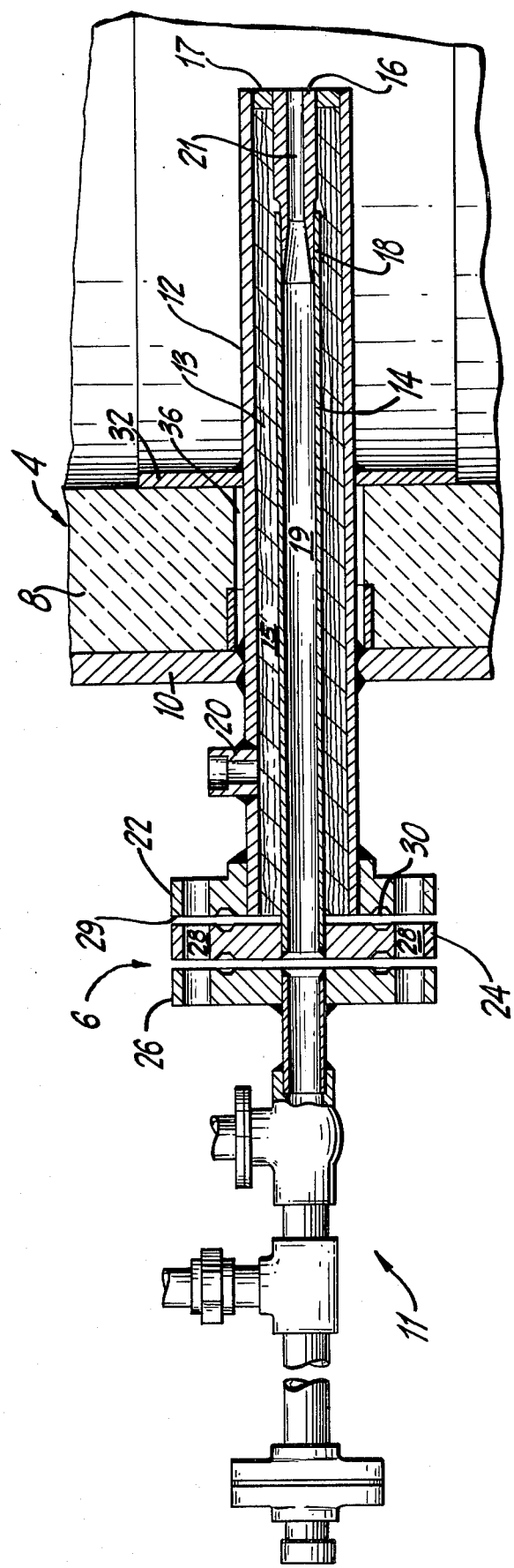
FIG. 2 is a cross-sectional plan view of one of the nozzle assemblies of FIG. 1.

In FIG. 2, the structure of a nozzle assembly 6 is shown. The assembly fits in an aperature 36 in the reactor shell 10 including the reactor shell's refractory lining 8.

The assembly 6 comprises an outer nozzle shroud 12 and an extractable feed nozzle 14. The shroud is a tubular metal jacket of, preferably, 3 inch diameter which encircles the feed nozzle 14. The shroud is welded to the reactor shell 10. A refractory retaining plate 32 encircles the aperature 36 in the reactor wall at the inside surface of the reactor against the refractory lining 8. The shroud 12 is welded to the reinforcement plate 32. The shroud is positioned within the reactor wall such that the shroud projects into the reactor chamber as well as projecting outwardly from the reactor shell 10.

At its exterior portion, the shroud 12 has a purge line orifice 20 which communicates with the interior of the shroud. This orifice is used in the event that a steam purge of the shroud is deemed necessary. The orifice facilitates the attachment of steam supply conduit by such attachment as a threaded coupling. A flange 22 is affixed to the outermost point of the shroud. The flange consists of an annular plate welded to the outside surface of the shroud. The flange has several bolt aperatures 28 therethrough as well as a machined surface which includes a concentric groove 30 capable of accepting and retaining an O-ring seal.

An extractable reactor feed nozzle 14 is positioned coaxially within the bore of the shroud 12. The nozzle comprises a relatively small diameter, preferably 1 inch, tubular pipe of compound structure. The outer portion of the nozzle has a flange 24 which coacts with the flange 22 of the shroud 12. The inner portion of nozzle tip 16 has an end plate 17 which engages the inside surface of the shroud. The nozzle tip 16 slideably engages the inner end 18 of the female portion of the nozzle. The nozzle tip 16 is reduced in outside diameter so as to readily accept the female portion of the nozzle. The two parts are welded together.

The flange 24 of the nozzle is provided with bolt aperatures 28 and with appropriate concentric grooves 30 on both surfaces of said flange 24 for engagement of O-ring seals. The flange 24 of the nozzle 14 and the flange 22 of the shroud 12 engage a similarly bolt aperatured flange 26 of the feed line 11. The flange 26 has provision for O-ring seals. The three flanges 22, 24, 26 are bolted together with typical O-ring seals sufficient to resist high operational temperatures.

The nozzle bore 19 is reduced at its inner tip to a relatively small diameter bore 21 so as to create a high velocity flow of fluid out of the discharge end of the nozzle. This high velocity stream creates a sufficiently dispersed spray pattern which discharges further into the reactor chamber than a straight line bore, while at the same time decreasing the potention for backflow into the nozzle bore from the reactor.

The space 13 defined by the inner surface of the shroud 12 and the outer surface of the nozzle 14 constitutes an insulated barrier for the nozzle from heat transmitted to the shroud 12 by the reactor. The space is filled with a refractory ceramic fiber material 15 which is wrapped about the nozzle. The design of the spaced nozzle and shroud assembly eliminates the need for close tolerances between the nozzle and shroud and allows for freedom in selection of materials for such components because of the absence of problems with respect to coefficients of expansion of such materials.

Figure 3:
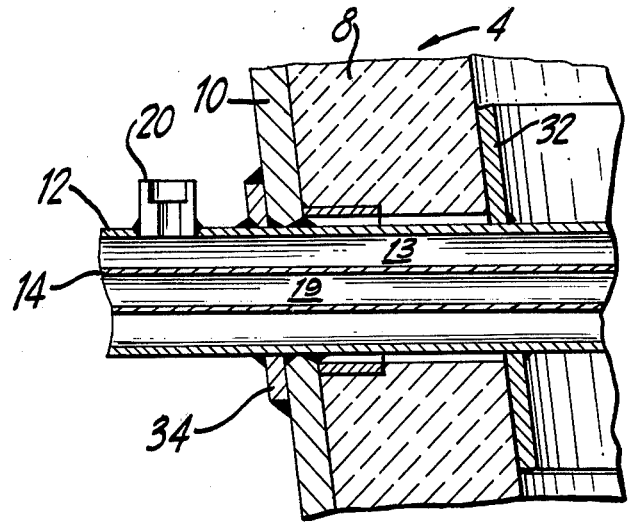
FIG. 3 is a cross-sectional detail plan view of an alternate structure of the nozzle assembly of the present invention.

FIG. 3 shows a detail of a slightly modified embodiment of the feed nozzle assembly of FIG. 2. In this case, the reactor shell 10 and the refractory lining 8 are canted at an angle to the vertical plane in order to signify a different point of elevation of the reactor shown in FIG. 1 where the nozzle can be located. As shown in FIG. 3, the assembly 6 is affixed to the reactor shell 10 with a reinforcement plate 34. The feed nozzle assembly 6 in this figure includes all of the components of the above-described embodiment, but such components are not shown in total in FIG. 3 for greater clarity in the additional features of FIG. 3.

The feed nozzle is readily insertable or extractable from the shroud and reactor for replacement or maintenance operations. In order to insert the nozzle into the shroud, the entire tubular length of said nozzle is first wrapped with sufficient refractory ceramic fiber to provide an overall outside diameter of 4 to 5 inches. The ceramic fiber wrap is then compressed to an effective outside diameter of $2\frac{1}{2}$ to 3 inches, of the effective inside diameter of the particular shroud pipe, by binding the ceramic fiber wrapped nozzle with thermoplastic tape or cord. In its reduced dimension the wrapped nozzle is slid into the shroud from the outside end. Appropriate O-ring seals are placed in the grooved flanges and the assembly is bolted together along with flanged connection of the feed line. The ceramic fiber material expands to fully occupy the space between the shroud and nozzle upon the application of sufficient heat to degrate or melt the thermoplastic tape or cord. Such heat can be supplied by the normal operation of the reactor, or if so desired, the assembly can be specifically heated. The ceramic fiber material then creates an insulated zone which prevents the leakage of particulates into the nozzle region, while at the same time providing insulation for the nozzle from the high temperatures of the reactor. Such protection can also be enhanced by a cast refractory coating 37 placed on the outer surface of the shroud where it projects into the reactor chamber.

The invention is described with reference to specific embodiments, but it is well within the abilities of those skilled in the art to make obvious modifications of the invention. Such modifications are deemed to be within the scope of this invention which is defined by the claims that follow.

What is claimed is:

1. In combination;
   (a) a reactor for the chemical or catalytic conversion of hydrocarbons having an outer metallic shell and an inner refractory lining;
   (b) at least one nozzle shroud projecting through an aperture in said shell and said lining;
   (c) a reactor feed nozzle disposed within a void in said nozzle shroud and concentrically positioned therein;
   (d) a compressible insulative refractory fiber wrapped about said one nozzle to a diameter greater than an inner diameter of said nozzle shroud, said fiber being compressed to slideably fit said nozzle within said shroud;
   (e) a low melting-point material wrapped about said compressed insulative refractory fiber, which upon heating allows said insulative refractory fiber to expand to said inner diameter of said shroud, thus completely filling said void in said nozzle shroud.

2. The combination of claim 1 wherein the nozzle shroud is coated with a protective material on an outer surface thereof within the reactor.

3. The combination of claim 2 wherein the protective coating material is a cast refractory ceramic.

4. The combination of claim 1 wherein said nozzle shroud extending into said reactor beyond said refractory lining terminates in a flange, and said feed nozzle terminates in a flange which is affixed to said flange of said shroud.

5. The combination of claim 1 wherein said nozzle comprises an exterior flanged portion and an interior tip portion which slideably engages with an inner portion of said shroud so as to provide a compound nozzle structure within said nozzle shroud.

6. The combination of claim 1 wherein said wrapped insulative refractory fiber is a ceramic material.

* * * * *